3,174,942
SOIL EROSION CONTROL DIENE LATEX COMPOSITION

Carl R. Erikson, Maywood, N.J., and Vincent Tedeschi, Brooklyn, N.Y., assignors, by mesne assignments, to The Borden Company, a corporation of New Jersey
No Drawing. Filed Aug. 7, 1961, Ser. No. 129,508
5 Claims. (Cl. 260—27)

Our invention relates to soil erosion control and in particular provides a composition for application to the surface of the ground effective to deposit a film on such surface bonding the surface soil particles.

It is known that elastomer-forming latices sprayed or otherwise spread on the surface of the soil to an application depth on the order of one fiftieth to one eighth of an inch will form continuous hydrophobic films bonding the surface soil particles and which, although continuous, are sufficiently porous to permit the soil to breathe air and moisture. Such films are utilized where soil erosion is a significant problem, for example, in the banking of young citrus trees in the winter months, and holding down freshly seeded soil in areas of significant inclination. Such films are also useful in improving the condition of sub-surface soil through the control of evaporation of moisture which they provide, in aiding seed germination because of moisture retention, in controlling aeration of soil by reason of the improvement in soil permeability, in improving absorption through osmosis of the beneficial fertilizing chemical elements, such as nitrogen, phosphorus, potassium and trace elements and in forming an ideal medium for the culture of beneficial soil bacteria. Generally, the films laid down using such latex compositions are applied by spraying or similar techniques, and when the deposited film dries it forms a crust bonding the soil molecules at the surface preventing erosion and dusting by high winds.

A particular problem encountered, however, in using such film forming latices for soil erosion control is the limit on the useful life of the deposited film caused by the tendency of the film to deteriorate upon weathering and leaching of hydrophilic components which break the continuity of the film and destroy the ability of the film to hold the surface soil particles together. We have found that the useful life of such films and their ability to bond the surface soil particles can be increased, such that one application will last as long as four months without maintenance, by adding to the latex a proportion of bentonite and of a resinate compound, other than a fixed alkali resinate, provided the proportion of fixed alkali introduced with other components of the composition is held to a minimum.

As is well known in this art (see U.S. Patent No. 2,961,799) the latex should form a water-insoluble rubbery film and, hence, almost any elastomer-forming polymer can be used. Thus, for example, natural rubber latex, reclaimed rubber latex, latices of synthetic materials such as polyisoprene, nitrile rubber, polysulphide, silicone rubber, polyester rubber and the like have been suggested. We have found, however, from the standpoint of the film produced, best results are obtained utilizing latices of butadiene-styrene copolymer, butyl rubber and neoprene. Generally, in usage, the latex composition should be diluted with water to reduce the polymer solids content to about 10 to 30 parts per thousand for best results in application to the soil using conventional spraying equipment. While for shipping purposes the most concentrated mixture practical should be used, in view of the bentonite in our composition, sufficient dilution to keep the bentonite proportion less than about 5% of the total concentrated composition is required.

Generally, the amount of polymer required for permeable films is on the order of 150 pounds per acre, while non-permeable films can be obtained on the order of 500 pounds of polymer per acre.

The bentonite utilized in the composition of our invention appears to impart a better matrix to the film, while at the same time increases the water repellancy of the film and to some extent stabilizes the latex. Generally, the proportion of bentonite is on the order of about 2% to about 25% of the weight of polymer solids in the latex. As pointed out above, it should not be in excess of about 5% of the total composition, as the viscosity of the composition becomes unmanageable with quantities of bentonite in excess of that amount.

The resinate employed appears to function in the composition by improving the film coalescence and continuity of the film. The resinate should not be an alkali metal soap but suitably is an ester of a polyhydric alcohol and rosin acids, disproportionated rosin acids or hydrogenated rosin acids; preferably, however, the resinate is ammonium resinate. Generally the proportion of resinate can be varied to a considerable extent between about 4% and 80% of the weight of polymer solids in the latex composition.

We have found that alkali metal soaps frequently found as emulsifiers in the latex compositions which are commercially available leave an undesirable effect on the life of the deposited film and can be tolerated in an amount not in excess of about 10% of polymer solids. Higher amounts of fixed alkali unduly increase the water sensitivity of the deposited film with concomitant lower water resistance and higher leachability of the film such that the film rapidly loses its continuity and its function in erosion control is destroyed. We have also found that the speed of coalescence of the deposited film is an inverse function of the proportion of fixed alkali in the composition, and for this reason also the proportion of fixed alkali should be held to a minimum. It should be noted, however, that for long life of the deposited film as required in tree banking, alkali metal soaps should be not in excess of 4% by weight of polymer solids, while surprisingly seed germination requires a higher value, i.e., on the order of 4% to 10% of polymer solids.

In addition to the above ingredients, the latex composition will of course contain conventional additives, such as anti-oxidants, dispersing agents, pigments and the like. Thus, for example, ammonium resinate is commercially available as an aqueous emulsion containing a trace of casein or other protective colloid. Carbon black or similar pigment is desirable to increase the temperature of the covered soil and speed seed germination. The inclusion of pigments is also desirable as an indication of where and how much material has been applied. Similarly, as suggested above, various commercially available latices contain emulsifiers, such as alkali metal resinates and stearates, and anionic, cationic and nonionic surfactants. The bentonite used in my latex composition desirably is dispersed by adding a small proportion of a surfactant such as an alkyl aryl sulfonate. Generally speaking, however, aside from the necessary use of emulsifiers and dispersants, the inclusion of hydrophilic material tends to make the deposited film hygroscopic permitting the film to be leached out, and thus should be minimized.

Example I

A concentrated latex composition in accordance with our invention was prepared having the following composition.

| Ingredient: | Parts by weight |
|---|---|
| Butadiene-styrene latex | 50.00 |
| Bentonite | 3.00 |
| Ammonium resinate emulsion | 10.00 |
| Darvan No. I (dispersant) | .10 |
| Agerite Spar (anti-oxidant) | .55 |
| Agerite White (anti-oxidant) | .10 |
| Carbon black (aqueous dispersion 50% solids) | 3.00 |
| Water | 33.25 |

The latex employed was a low soap formulation of SBR-2000 containing 42% average solids having a typical pH of 11.2 with an average proportion of 46% styrene monomer and having a soap content (sodium and potassium salts of rosin acids) on the average of 3.5% by weight of copolymer solids. Conventional SBR-2000 is to be distinguished by a higher proportion of soap on the order of 4% to 8% of copolymer solids.

The bentonite employed had the following chemical analysis:

| | Percent |
|---|---|
| Silica | 64.32 |
| Alumina | 20.74 |
| Ferric oxide | 3.03 |
| Ferrous oxide | .46 |
| Titanium oxide | .14 |
| Phosphoric acid | .01 |
| Lime | .52 |
| Magnesia | 2.30 |
| Soda | 2.59 |
| Potash | .39 |
| Sulfur | .35 |
| Other minor constituents | .01 |
| Chemically held $H_2O$ | 5.14 |
| Mechanically held water | 0.00 | and had a sieve fineness of 99.40% through 200 mesh and 98.14% through 325 mesh.

The ammonium resinate was an aqueous dispersion containing 40% solids of rosin acids and disproportionated rosin acids in which the dispersing alkali was ammonium hydroxide and is commercially available as Dresinol #42, a proprietary product.

Darvan No. I, a proprietary product, is a powder of polymerized sodium salts of alkyl naphthalenesulfonic acid.

Agerite Spar, a proprietary product, is a styrenated phenolic resin containing 65% solids in aqueous dispersion.

Agerite White, a proprietary product, is symmetrical di-beta-naphthyl para-phenylene-diamine containing 55% solids in aqueous dispersion.

The concentrated latex composition with the proportion of water indicated above is suitable for shipping purposes and represents the preferred composition in accordance with our invention. In use it should be diluted with from 6 to 10 parts of water and preferably 8 parts of water for each part of the concentrated composition. In one instance, 55 gallons diluted 8 to 1 (440 gallons total) was sprayed on 1243 young citrus tree banks. The film which was deposited remained intact without reworking or rebanking over a three month winter period without noticeable erosion or loss of the banks, although during the three month period winds up to 60 miles per hour were experienced, temperatures ranging between 26° and 87° F., and accumulated rainfall of 11.4 inches were experienced.

Essentially the same results are obtained when butyl rubber latex and neoprene latex are substituted in the composition to yield the same proportion of polymer solids. The deposited films exhibit a rubbery, continuous and porous character which is well bonded to the surface soil particles.

The following table lists a series of compositions in accordance with our invention designated Examples II-VIII, inclusive. In each case, although not noted in the table Darvan No. I was employed to disperse the bentonite in an amount of 3.3% based on the weight of the bentonite. Agerite White in an amount of 1.1% based on the weight of the latex and Agerite Spar in an amount of 0.25% based on the weight of the latex were also included as anti-oxidants.

Each of the compositions of Examples II through VII when diluted between 6:1 and 10:1 with water form satisfactory soil erosion preventive compositions for tree banking which deposit films exhibiting long life and low water sensitivity, those of Examples V and VII being better than the others and being comparable to that of Example I. The composition of Example VIII, however, in similar usage is characterized by lack of reliability and deposits a film of relatively shorter life. Example VIII is included, however, since it represents a preferred composition for soil erosion prevention in seeded areas for which the composition of Examples I-VII are less satisfactory.

| Example No. | Latex | Parts by Weight | Parts by Weight Bentonite | Resinate | Parts by Weight | Pigment | Parts by Weight | Parts by Weight Water |
|---|---|---|---|---|---|---|---|---|
| II | SBR-2000 [1] (Special) | 50 | 0.5 | Diethylene glycol ester [2] (40% solids) | 2.0 | Carbon black dispersion | 3.00 | 33.25 |
| III | SBR-2000 [1] (Special) | 50 | 5.0 | Glycerol ester [2] (40% solids) | 16.0 | None | | 33.25 |
| IV | Butyl Rubber (55% solids) [5] | 38 | 5.0 | Ethylene glycol [3] ester (40% solids) | 2.0 | None | | 54.25 |
| V | do. [5] | 38 | 3.0 | Ammonium [2] (40% solids) | 10.0 | Chromium oxide green | 9.00 | 41.25 |
| VI | Neoprene (50% solids) | 42 | 0.5 | Sorbitol ester [4] (45% solids) | 16.0 | Carbon black dispersion | 3.00 | 34.25 |
| VII | do | 42 | 3.0 | Propylene [3] glycol ester (45% solids) | 10.0 | None | | 37.25 |
| VIII | SBR-2000 [6] | 50 | 3.0 | Ammonium [2] (40% solids) | 10.0 | Carbon black dispersion | 3.00 | 33.25 |

[1] Same SBR-2000 as Example I.
[2] Resin is mixture of rosin acid and disproportionated rosin acid.
[3] Resin is hydrogenated rosin acid.
[4] Resin is rosin acid.
[5] 2½% non-ionic dispersing agent.
[6] Soap content based on polymer is 4-8%, total solids 42%.

Thus four series of tests were run side by side. In each series of tests, four 11″ x 18″ flats were employed, two being seeded with five grams each of perennial rye grass and two being seeded with seven grams each of a mixture of fescues. In each series of tests, one flat seeded with the rye grass and one flat seeded with the fescues were positioned outside while the remaining pair of flats were positioned inside in direct sunlight beneath a skylight. All the flats were inclined at a 30° angle, while those flats outside were watered twice a day and those flats inside were watered once a day. In one series of tests, each flat was sprayed with 10 cc. of the composition of Example I diluted with 80 cc. of water. The second series of tests, each flat was sprayed with 10 cc. of the composition of Example VIII diluted with 80 cc. of water. The third series flats were each sprayed with 90 cc. of a commercially available soil erosion preventive composition having a latex base, while the fourth series of flats had no protection. The tests were begun in the middle of June and extended through July. Visual observation was periodically made and it was noted that throughout the test period the best results both inside and outside were observed on the series of flats of both grasses which had been sprayed with the diluted composition of Example VIII. The next best results including both grasses and both inside and outside were the series of flats sprayed with the diluted composition of Example I and the series of flats sprayed with the commercial soil erosion preventive composition. The series of flats which had no protection were noticeably poorer than any of the other three. It should be noted that uniformly the flats which had been positioned outside exhibited poorer grass growth and germination rate than those inside, probably because of the extremity dry and hot summer weather at the time of the test.

In general it should be added that the amount of application of the latex soil erosion control compositions of our invention also differs, dependent upon usage. Thus in tree banking an application depth of 0.06" to 0.12" is preferred, while in protection of seeded areas an application depth of 0.02" to 0.04" is preferred.

We claim:
1. A soil erosion control composition comprising a latex of an elastomer-forming polymer, bentonite in an amount from about 2% to about 25% of the weight of said polymer solids, a resinate selected from the group consisting of the ammonium soaps of rosin acids, the ammonium soaps of disproportionated rosin acids, the ammonium soaps of hydrogenated rosin acids, polyhydric alcohol esters of rosin acids, polyhydric alcohol esters of disproportionated rosin acids, and polyhydric alcohol esters of hydrogenated rosin acids in an amount of about 4% to about 80% of the weight of said polymer, and water in an amount sufficient to reduce the proportion of bentonite below about 5% by weight, the proportion of fixed alkali in said composition not exceeding 10% of the weight of said polymer.

2. The composition according to claim 1 in which said elastomer-forming polymer is selected from the group consisting of butadiene-styrene copolymer, butyl rubber and neoprene.

3. The composition according to claim 2 in which said resinate is an aqueous dispersion of a mixture of rosin acids and disproportionated rosin acids in which the dispersant is ammonium hydroxide.

4. The composition according to claim 2 in which the latex is a butadiene-styrene latex, having an alkali soap content less than 4% by weight of copolymer.

5. The composition according to claim 2 in which the latex is a butadiene-styrene latex, having an alkali soap content between 4% and 10% by weight of copolymer.

References Cited by the Examiner
UNITED STATES PATENTS

| | | | |
|---|---|---|---|
| 2,625,529 | 1/53 | Hedrick | 47—58 |
| 2,799,973 | 7/57 | Smith | 47—58 |
| 2,961,799 | 11/60 | Coe | 47—9 |
| 3,015,638 | 1/62 | Sergi | 260—29.7 |

OTHER REFERENCES

Condensed Chemical Dictionary, Fifth Edition, published by Reinhold (N.Y.), 1956. Page 138 relied upon.

MURRAY TILLMAN, *Primary Examiner.*

WILLIAM H. SHORT, A. JOSEPH GOLDBERG,
*Examiners.*